April 19, 1966  P. P. RUPPE  3,246,429
APPARATUS FOR SURFACE FINISHING ARTICLES
Filed April 6, 1962

INVENTOR.
PETER P. RUPPE
BY
Burton & Parker
ATTORNEYS

April 19, 1966  P. P. RUPPE  3,246,429
APPARATUS FOR SURFACE FINISHING ARTICLES
Filed April 6, 1962  5 Sheets-Sheet 3

INVENTOR.
PETER P. RUPPE
BY
Burton & Parker
ATTORNEYS

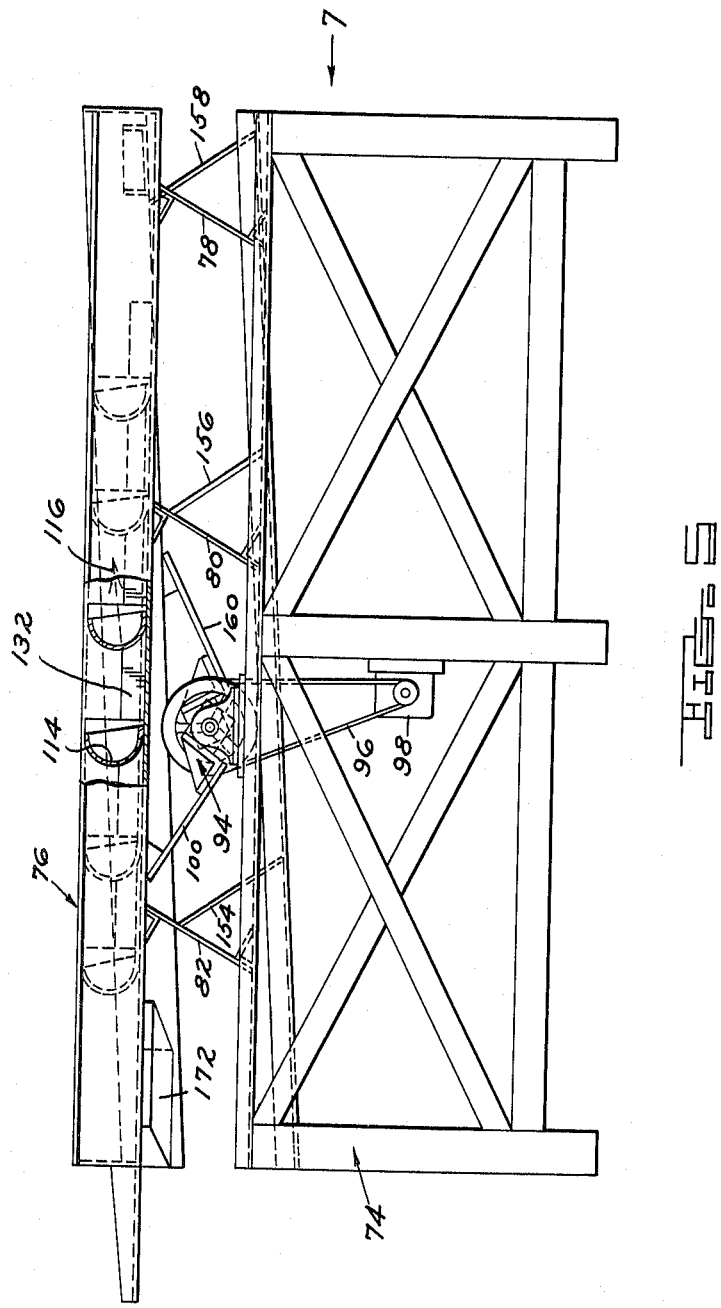

April 19, 1966  P. P. RUPPE  3,246,429
APPARATUS FOR SURFACE FINISHING ARTICLES
Filed April 6, 1962  5 Sheets-Sheet 5
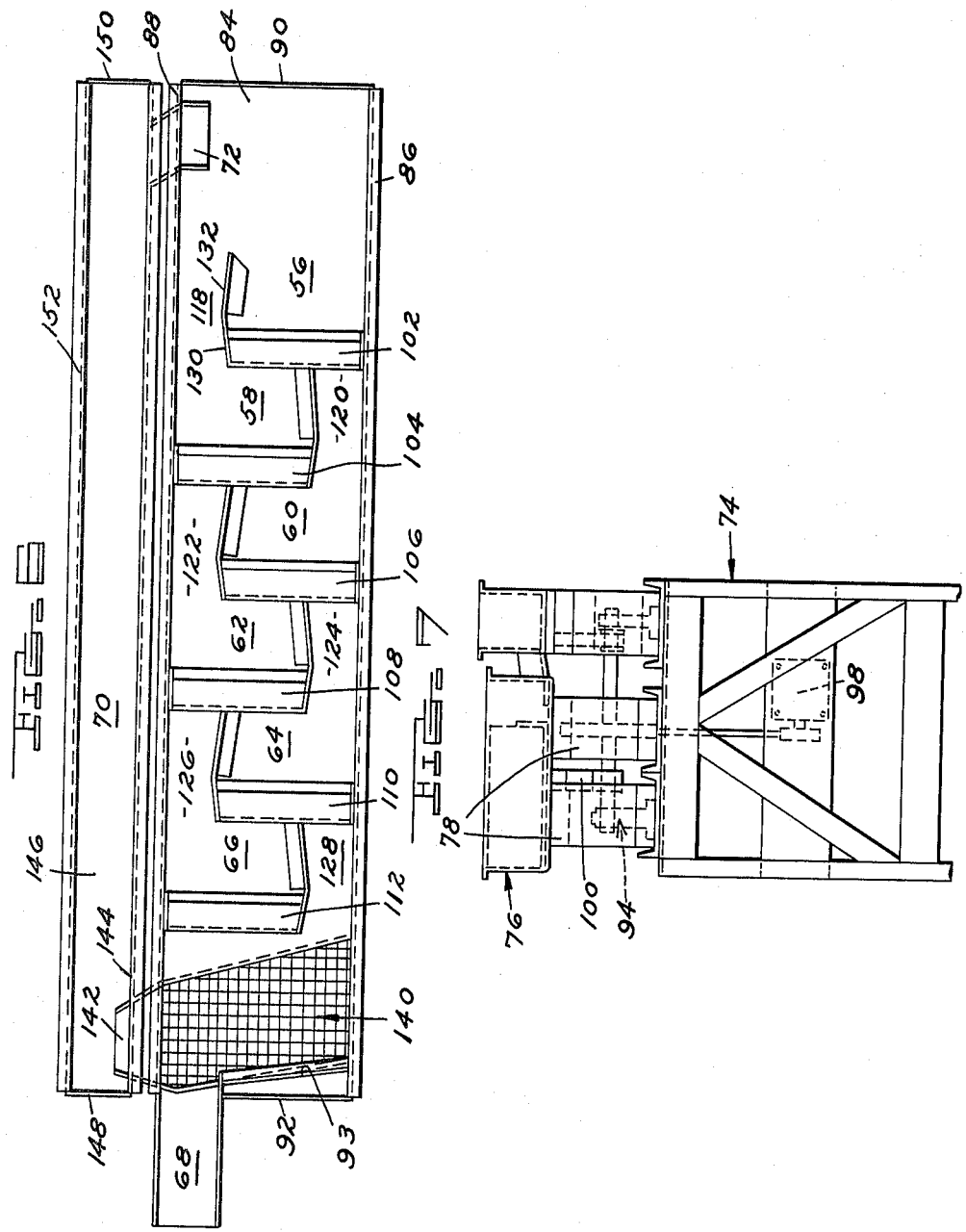
INVENTOR.
PETER P. RUPPE
BY
Burton & Parker
ATTORNEYS United States Patent Office 3,246,429
Patented Apr. 19, 1966

3,246,429
APPARATUS FOR SURFACE FINISHING ARTICLES
Peter P. Ruppe, 20 Hampton Road, Grosse Pointe 36, Mich.
Filed Apr. 6, 1962, Ser. No. 186,302
3 Claims. (Cl. 51—7)

This application is a continuation-in-part of my application Serial No. 853,393 filed Nov. 16, 1959, now Patent No. 3,187,473, dated June 8, 1965.

This invention pertains to the art of metal finishing. More particularly, it relates to ways and means for surface finishing articles as by deburring, scrubbing, abrading, or the like.

In fabricating metallic parts and the like, it frequently happens that burrs and rough surfaces are formed on the articles. One procedure for removing burrs and roughness of the surfaces of the articles is by barrel finishing. This procedure involves a barrel and abrasive particles inside of the barrel. The articles to be surface finished are placed in the barrel and the barrel is rotated on its axis whereby both abrasive particles and articles are tumbled together.

This procedure cannot be used, however, on many articles because of their fragile nature. The tumbling action involved is inherently too rough and hard on such articles.

In other instances such a procedure is not too effective because of the shape of the article to be finished. The abrasive particles in such instances do not appear to reach or at least to have any effect on burrs on edges somewhat shielded from the abrasive particles under tumbling conditions.

In both cases it has been necessary to manually deburr each individual article. This, of course, is inefficient and expensive. There is a need, therefore, for ways and means for mechanically deburring and surface finishing articles of a fragile nature and of odd shape.

An object of this invention is to provide ways and means for mechanically deburring or surface finishing articles regardless of their fragility and regardless of any irregularity in shape.

Another specific object of this invention is to provide an apparatus for surface finishing articles which operates to gently handle the articles and is capable of handling articles which, under barrel finishing procedures, would remain relatively unaffected.

Another object is to provide apparatus for continuous deburring of articles, as distinguished from a batch method such as the barrel finishing method. By this continuous method articles are introduced into a vibrating bed of abrasive particles and relative movement between the articles and particles of the bed serves to deburr the articles, the articles moving in a circuitous path through the bed to finally emerge from a discharge point of the bed. The method is such that articles may be continuously fed to the inlet of the bed and deburred articles continuously discharged from the discharge point of the bed, all without any interruption of the deburring process. Such portion of the abrasive particles as are discharged from the bed along with the articles, are collected and returned to the bed adjacent the article inlet to the bed.

In the apparatus aspect of this invention there is employed the general concept of a bin or deburring zone containing a bed of abrasive particles and articles to be finished with the bin being connected with vibratory conveyor means structure. Furthermore the downstream end of the bin toward which particles and articles are conveyed is provided with a deflector means comprising a curved wall to deflect particles and articles in a curved path in the bin or deburring zone. In one embodiment the curved deflector is shiftable to an inoperative position to allow the articles and particles to be discharged from the bin or zone. In another embodiment the deflector means is so constructed and arranged so that articles and particles may spill around an end of the curved wall for discharge from the deburring zone; and in a staggered arrangement of the zones the articles spill around the ends of the walls from one deburring zone to the next.

These and other concepts involved in this invention are present in the embodiment illustrated in the drawings which form a material part of the disclosure.

Turning to the drawings, it will be observed that:

FIG. 5 is a side view of another embodiment of the invention, an embodiment in which a continuous deburring method may be practiced;

FIG. 6 is a top view of the machine of FIG. 5; and

FIG. 7 is an end view of the apparatus of FIG. 5 looking in the direction of arrow 7 therein.

*Apparatus structure of FIGS. 1–4*

Figures 1, 2:
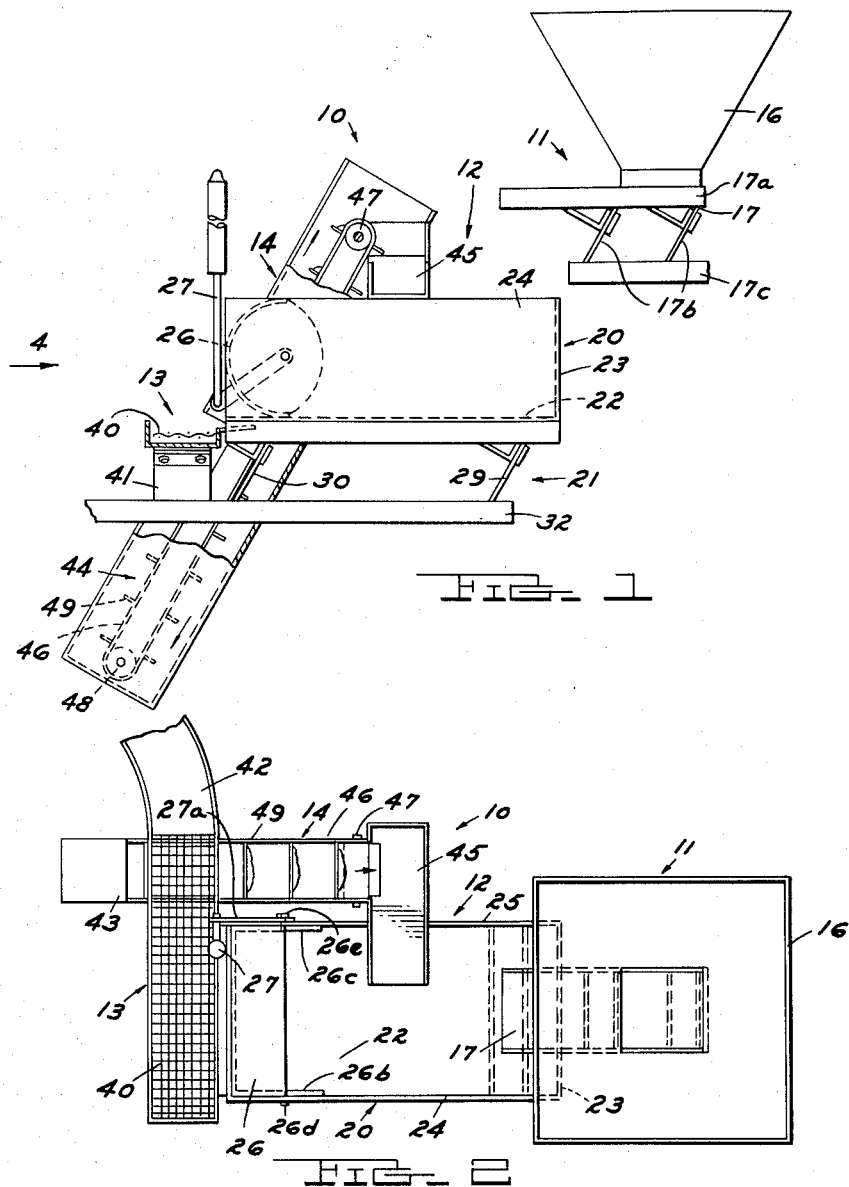
FIG. 1 is a general side view of one embodiment of the article-finishing machine of this invention.
FIG. 2 is a plan view of the machine shown in FIG. 1.

In greater detail, the drawings disclosed an article-finishing machine 10. As shown in FIGS. 1 and 2, the machine 10 comprises an article feed section 11, a bin section 12, a screen section 13, and an abrasive particle return section 14.

The article feed section 11 comprises a hopper 16 for receiving and storing articles to be finished. Below the discharge end of the hopper 16 there is provided a vibratory conveyor 17 for delivering articles from the hopper 16 to the front end of the bin section 12. The conveyor 17 includes a trough or the like 17a disposed beneath the discharge end of the hopper 16 in article-receiving relation therewith. The trough is supported on flexible leaves 17b which are mounted in angularly upstanding relation on a support 17c. Means, not shown, coupled to the trough, serve to impart a horizontal reciprocatory component of motion thereto. However, because of the angular disposition of leaves 17b the trough also has a vertical component of motion with the resultant motion being along an inclined plane whose lower end is below the discharge end of hopper 16 and whose upper end is above the bin section 12. The reciprocatory or vibratory motion thus imparted serves to convey articles along the trough from beneath the hopper 16 to the discharge end of trough 17a. This vibratory-conveying principle is well understood in the conveying art and need not be further described.

The bin section 12 comprises a bin 20 supported on a vibratory conveyor assembly 21.

Figure 3:
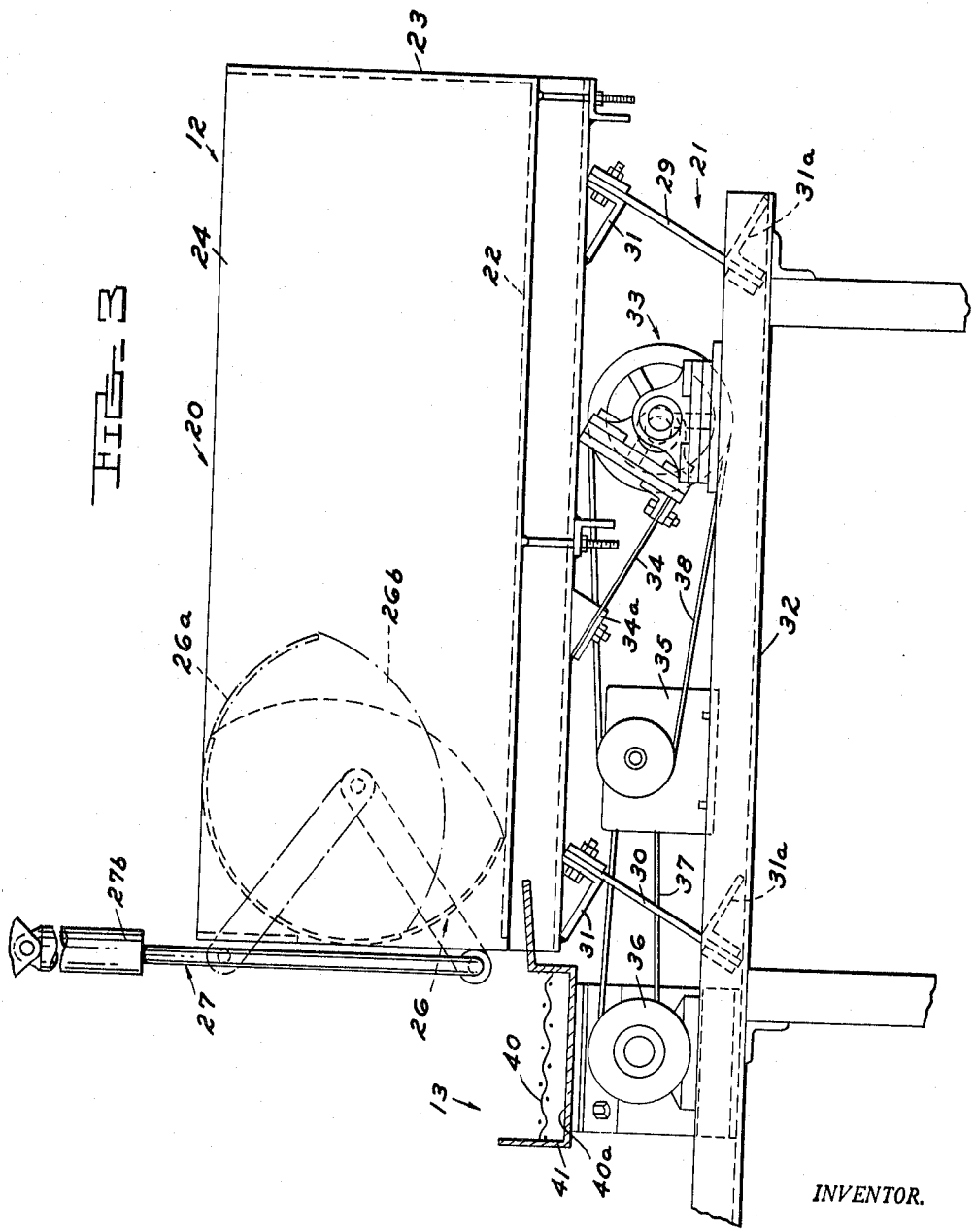
FIG. 3 is an enlarged, partially sectioned, side view of the main portion of the apparatus of FIG. 1, which view shows in detail the vibratory conveyor means structure of the machine.

The bin 20 has a generally horizontally disposed bottom 22, a front end wall 23, a pair of side walls 24 and 25 and an end closure member 26 adjacent the back end thereof. The end closure member 26 is an arcuate member 26a preferably semi-circular in side view. It extends across the width of the bin 20 between the side walls 24 and 25 with the concave side thereof facing the front end wall 23. It has a generally horizontal and transverse axis of rotation and is pivotally mounted on said axis to the side walls 24 and 25. Normally, the bottom end of the end closure member 26 bears against the bottom 22 of the bin 20. However, by means of a crank arm assembly 27, the end closure member 26 can be pivoted so as to lift its bottom end out of engagement with the bottom 22 and to a sufficient height to permit finished articles and abrasive particles in the bin to be conveyed to the screen section 13. To each end of arcuate member 26 are secured ovular end plates 26b and 26c as shown in FIGS. 2 and 3. These end plates overlie the inner wall surfaces of bin side walls 24 and 25. Each ovular end plate has a stub shaft as at 26d and 26e which extend through holes in the bin side walls 24 and 25 and rotatably support the end closure as aforesaid. Stub shaft 26e is secured as by welding, exteriorly of bin wall 24 to the crank arm 27a of the crank assembly 27.

The crank assembly 27 may be actuated in any suitable fashion, not shown. For example, manually, by grasping and lifting portion 27b to open the end closure, and upon release the weight of portion 27b will cause closure of the member 26a. Or, the assembly may be automatically controlled by a suitable electrically, mechanically, or fluid pressure operated device 27c.

The vibratory conveyor assembly 21 for the bin 20 is shown in FIG. 3. It, with the bottom 22, forms a vibratory conveyor bed. It involves a pair of leaf-spring supports 29 and 30 secured by brackets 31 to the bottom 22 of the bin 20 and secured to a stationary support frame 32 by similar brackets 31a. Mounted on the support frame 32 is an eccentric 33 having an eccentric rod 34 in the form of a leaf spring secured as by a mounting bracket 34a to the bottom 22 of the bin 20. Also mounted on the support frame 32 is a gear box 35 and a prime mover 36 preferably of the electric motor type. The eccentric 33 has a driven pulley. The gear box 35 has both a drive pulley and a driven pulley. The prime mover 36 has a drive pulley. By means of a drive belt 37 between the drive pulley of the prime mover 36 and the driven pulley of the gear box 35 and a drive belt 38 between the drive pulley of the gear box 35 and the driven pulley of the eccentric 33 movement of the prime mover 36 is transmitted to the eccentric 33.

Under operative conditions the eccentric 33 imparts a motion to the bin 20 which comprises vertical and horizontal components of motion with the resultant motion being in the direction of an inclined plane the lower end of which is at the right-hand side of FIG. 3 and the upper end of which is at the left-hand side of FIG. 3. The bin is supported as aforementioned upon the leaf springs 29 and 30 which allow for this inclined motion. As the bin 20 moves upwardly along the incline, it serves to elevate and to move toward the left-hand end of the bin articles to be finished as well as finishing particles in the bin. The incline is not a ture incline but more of an arcuate incline. However, the vibratory movement of the bin imparted thereto by the eccentric 33 is such that once the articles and particles are moving upwardly and to the left as viewed in FIG. 3, the sudden retraction of the bin downwardly and toward the right allows the articles and the particles to continue their upward and left-ward motion. The momentum of the articles and the particles in the bin is sufficient to cause this continued motion thereof during downward retraction of the bin. This completes one cycle of vibratory movement. Successive cycles serve to continue the conveying motion of the articles and the particles in the bin toward the left-hand end thereof. The leaf spring 34 serves to allow the vibratory movement of the supporting bed of the bin relative to the eccentric 33 while connecting the eccentric to the bin for the reciprocatory motion.

Such vibratory motion of the bin bottom 22 is rapid and the distance of travel thereof is small. In this regard, it has been found that an eccentric speed of 800 revolutions per minute is satisfactory for the purposes of this invention.

Figure 4:
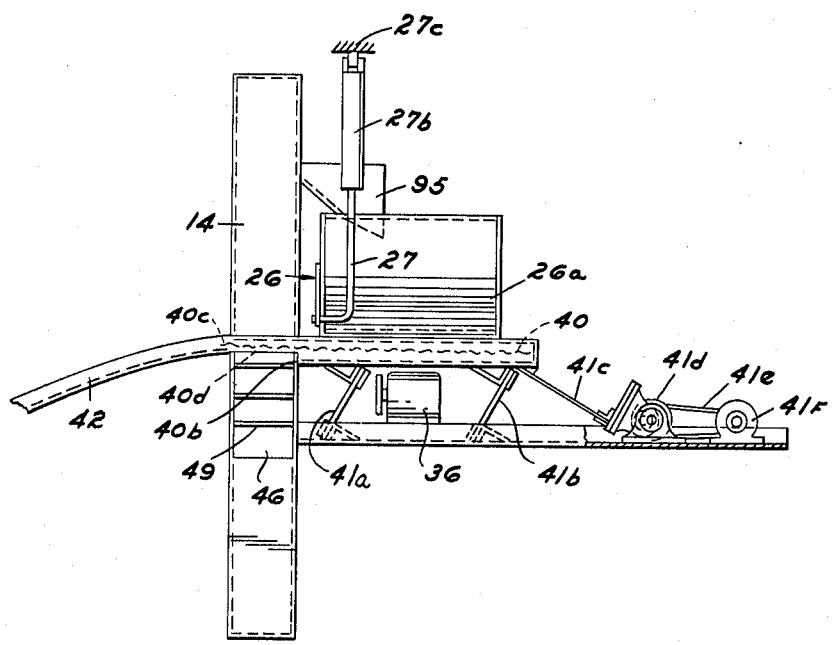
FIG. 4 is an end view of the apparatus taken in the direction of arrow 4 in FIG. 1.

As shown in the figures of the drawings, the screen section 13 comprises a generally horizontally disposed screen 40 mounted between the side rails of a generally horizontally disposed particle-receiving chute 41. The chute is mounted upon the support 32 similar to the mounting of the bin 20, i.e., upon a pair of leaf springs 41a and 41b as shown in FIG. 4. A leaf spring 41c connected to the chute and to an eccentric 41d serves to impart vibratory motion to the chute. The eccentric 41d is driven through a belt drive or the like 41e by an electric motor 41f. Beneath the screen 40 the chute is provided with a bottom wall 40a upon which deburring particles rest upon falling through the screen. The finished articles remain on top of the screen 40. The vibratory conveying motion of the chute conveys the articles and the particles therealong from right to left as viewed in FIG. 4. The bottom wall 40a terminates as at 40d to define a particle-discharge opening 43 through which finishing particles may discharge from the chute into an elevator 14. The screen terminates at point 40c over the bottom wall of a discharge chute 42 leading to a storage space or collecting station.

The abrasive particle return section 14 comprises an elevator 44 for receiving abrasive particles from the discharge opening 43 and for elevating the same to a height above the bin 20. Below the end of the elevator 44 at this height there is provided a downwardly inclined particle return chute 45, the bottom end of which is over the bin 20. The elevator 44 illustrated in FIGS. 1 and 2 of the drawings comprises an endless belt 46 mounted at the upper end thereof on a drive roll 47 and at the bottom end thereof on an idler roll 48. The outside of the belt is provided with a plurality of flights 49 which intercept abrasive particles from the discharge opening 43, convey the particles upwardly to the top end thereof and dump the same into the return chute 45.

*Apparatus operation of FIGS. 1–4*

To prepare the machine 10 for use, the end closure member 26 of the bin 20 is closed so that the bottom end thereof is in engagement with the bottom 22 of the bin 20. Abrasive particles are introduced into the bin 20 in sufficient quantity to provide a bed on the bottom 22. The hopper 16 is then charged with articles to be finished. The machine 10 is now ready for operation.

The vibratory conveyor 17 is then actuated whereupon articles to be finished are conveyed from the hopper discharge to the end of the conveyor 17 and into the bin 20.

The prime mover 36 is then turned on whereby vibratory conveying forces are created by the vibratory conveyor assembly 21 and applied to the bin bottom 22. This causes abrasive particles and articles to be finished to be subjected to the vibratory conveying forces. Articles on top of the bed sink into the bed and become surrounded by the relatively abrasive particles.

Because of the difference in mass between the articles to be finished and the relative abrasive particles, the vibratory conveying forces acting thereon produce relative motion between the abrasive particles and the articles to be finished whereby abrasive action on burrs or rough surfaces, or dirty surfaces to be cleaned on the articles takes place and the surfaces are finished.

In addition, particles and articles in the bed move towards the end closure member 26. As particles and articles reach the end closure member 26, they are deflected upwardly and backwardly because of the semi-circular shape of the end closure member 26. Such upward deflection causes a gentle circulatory movement of articles in the bed with the result that all portions of articles to be finished are contacted by the abrasive particles regardless of the shape of the article.

When a desired number of articles to be finished have been introduced into the bin 20 from the hopper 16, the vibratory conveyor 17 is then stopped. After a sufficient period of time for finishing of all articles in the bed has elapsed, the back end closure member 26 is opened by actuating the crank arm assembly 27 and the elevator 44 turned on. Because of the vibratory conveying action of the bottom 22 of the bin 20, particles and articles are conveyed to the back end thereof and onto the screen 40. The motor 41f may be started simultaneously with the opening of the end of the bin 20, as well as the driving means (not shown) for the elevator 14. Abrasive particles and burrs fall through the screen 40 into the particle chute 41. Finished articles move downwardly on the screen 40 and into the article-receiving chute 42 whereby they are conveyed, for example, to an article-collecting station. Abrasive particles on the particle chute 41 move to the discharge opening 43 whereat they fall onto the top surface of the belt 46 of the elevator 44. Once on the endless belt 46 and with the aid of the flights 49, the abrasive particles are elevated up to the upper end thereof and dumped into the return chute 45 and thereby into the bin 20.

When all of the finished articles have been discharged from the bin 20, the back end closure member 26 is closed as by actuating the crank arm assembly 27. When the articles and particles have cleared the chute 40, motor 41f is de-energized, and the elevator 14 stopped once the particles therein have been discharged back into bin 20. The starting and stopping of the various conveyors, the elevator, and the opening and closing of end closure 26, may all be automatically controlled, if desired, in any suitable fashion. The procedure is then repeated.

The length of time which the articles to be deburred reside in the bin 20 under normal operative conditions is dependent upon the nature of the surface to be finished, the nature of the abrasive particles, the frequency of vibration imposed upon the bin 20, and the amplitude of the vibration. These factors, obviously, are determined by local conditions and can best be ascertained by the machine operator upon confronting the local conditions.

The number of articles to be finished in the bin 20 during each finishing cycle of the machine 10 is dependent upon the volume of each article, the volume of abrasive particles in the bed and the volume of the bed. These factors are again determined by local conditions. In general, optimum conditions are obtained when using abrasive particles of smaller particle size than the articles to be deburred and when using a dense bed of abrasive particles.

The apparatus shown in FIGS. 5–7 inclusive is adapted to carry out what may be thought of as a continuous article finishing method as distinguished from a batch or semi-batch type method accomplished by the apparatus of FIGS. 1–4 inclusive. The continuous method apparatus comprises, as shown in FIG. 6, a succession of article finishing zones 56, 58, 60, 62, 64 and 66 which provide for successive beds of abrasive articles and particles. During operation of the apparatus the beds are subjected to vibratory conveying forces, and articles and particles overflow or spill from one bed to the next along the succession of beds from the upstream end 56 to the downstream end 66. Overflow or spillage from the downstream bed is collected and the articles and particles separated from each other, the articles discharging through chute 68 while the particles are returned by the transfer means 70 to be introduced to the upstream end of the apparatus through reentry chute 72. The spillage results from having such a quantity of abrasive particles in the beds together with the articles to be surface finished, that upon subjecting the beds to the vibratory forces, the particles and articles overflow or spill from the beds as they move in their circulatory path through the beds. The movement of the articles and particles in each of the beds is similar to that heretofore described in connection with the apparatus of FIGS. 1–4 inclusive.

More particularly the apparatus comprises a frame 74 upon which an elongate trough-like bin 76 is supported by angularly disposed pairs 78, 80 and 82 of leaf springs, similar to the support of bin 20 heretofore described. The bin 76 has a bottom wall 84, parallel side walls 86 and 88 and end walls 90 and 92.

Connected to the bin for subjecting it to vibratory forces is vibratory mechanism including an eccentric drive 94 in driven engagement through a drive belt or the like 96 with motor 98 mounted on frame 74. A leaf spring 100 connects the eccentric to bin 76. Upon operation of the motor 98 the bin is subjected to a vibratory motion similar to bin 23 tending to move abrasive particles and articles to be surface finished disposed within the bin from the upstream end thereof (the right-hand end as viewed in FIG. 6) toward the downstream end (the left-hand end). The springs 78, 80 and 82 are preferably at an angle of 60 degrees. The amplitude of vibrating motion is preferably 5/16 of an inch and the frequency in a range from 600 to 2400 cycles per minute.

Within the bin are a succession of baffle means cooperating with the bottom and side walls of the bin to define finishing zones or beds of abrasive particles and articles to be surface finished. Such baffle means comprises a series of recirculating baffles 102, 104, 106, 108, 110 and 112 each of which has a concave face 114 as shown in FIG. 5. The baffles are generally semi-cylindrical in section. Each return baffle is secured along its lower edge to the floor 84 of the bin and cocked in a slight angle such that its concave face tends to open slightly upwardly as along arrow 116 in FIG. 5. The recirculating baffles are disposed in successive laterally staggered relation along the bin as shown in FIG. 6 to provide passageways as at 118, 120, 122, 124 and 126 around opposite sides of successive finishing zones. Such passageways allow overflow or spillage of articles and particles from one finishing zone or bed to be transferred to the next zone or bed in the succession. One end of each recirculating baffle juxtaposes a side wall of the bin while the opposite end is spaced from the other side wall by the width of the aforementioned passageways. Such opposite end of each recirculating baffle is closed by a secondary baffle comprising a first portion 130 juxtaposing such end of the recirculating baffle and a second portion 132 disposed at an angle to the first portion and extending upsteam of the recirculating baffle to define with the recirculating baffle and the opposed side wall of the bin each of the finishing zones, such as zone 56.

Baffle portion 132 of each of the secondary baffles rises upwardly from the bottom wall or floor 84 of the bin a distance not quite but approaching one-half the rise of the recirculating baffles as clearly shown in FIG. 5. The overflow or spillage of abrasive particles and articles being finished occurs principally over this baffle portion 132 of each secondary baffle. The height and length of this portion therefore determines to a great extent the quantity of articles and particles that may be contained within each finishing zone.

As articles and particles spill over baffle portion 132 they fall to the floor 84 of the bin in the passageways 118, 120, etc., which areas of the floor provide a means for transferring particles and articles to the next successive finishing zone or bed.

At the downstream end of the succession of beds or finishing zones is the article and particle separator means comprising a screen 140 spanning an opening in the floor 84 of the bin and having a mesh sized such that abrasive particles will fall therethrough while articles will pass thereover and out article chute 68. A deflector wall 93 is provided along the downstream side of the screen 140 to guide articles into chute 68. Below the screen is a particle transfer chute 142 disposed on a downwardly sloping incline and adapted to catch particles from separator 140 and convey them to the return transfer device or conveyor 70 for reintroduction to the opposite end of bin 76. The chute 142 may be secured to the bottom of bin 76 and empty through an opening in side wall 144 of conveyor 70.

Conveyor 70 includes a bottom wall 146, end walls 148 and 150, and another side wall 152. It slopes upwardly as shown so that its high end is disposed above the bottom wall 84 of bin 76. The particle reentry chute 72 connected to conveyor 70 empties particles travelling up the conveyor back into the upstream end of the bin 76. Conveyor 70 is supported on framework 74 by leaf springs 154, 156 and 158 which are angled reverse of springs 78, 80 and 82 because the conveying motion to be imparted is the reverse of that in bin 76. Eccentric mechanism 94 is provided with an eccentric element and follower (not shown in detail) which are operatively connected to drive leaf 160 which is in turn connected to the conveyor 70. Consequently upon operation of motor 98, conveyor 70 is operated to convey abrasive particles from the lower end to the higher end for discharge through chute 72 back into the bin. The amplitude and frequency of conveyor 70 is such that it will return particles to the upstream end of the bin as rapidly as they pass through the collector.

For any given frequency and amplitude of vibratory movement imparted to bin 76, the rate at which articles to be finished will pass through the finishing operation is principally a function of the quantity or volume of articles and particles in the successive beds or finishing zones. This is so because the rate at which articles and particles spill out of the successive beds is a direct function of the quantity of particles and articles in the beds. If the particle level is high, the spillage is more rapid, and vice versa. Therefore if abrasive particles are added to the system in such quantity that taken together with a rate at which articles are fed to the system there is a high overflow rate between successive beds, the average length of time any of the articles will be subject to the surface finishing will be less than if the quantity of particles added or rate of article infeed are reduced. As a consequence the length of time that articles are subjected to the finishing operation becomes, for any given frequency and amplitude of vibratory conveying motion of the bin, a function of the rate at which articles and particles are fed into the upstream end of the succession of beds or finishing zones.

It has been found that if the proportion by volume of abrasive particles to articles to be finished is 1:1 that a very satisfactory finishing is obtained.

As heretofore mentioned the general direction of article and particle movement through the bin is from the upstream toward the downstream end thereof. During this general motion within each of the successive beds, the movement of articles and particles is deflected by the concave surface 114 of each of the recirculating baffles to cause the articles and particles to recirculate in each of the beds, such recirculation being counter the general direction of article and particle movement in the bed, similar to the motion of articles and particles in the bin 20 heretofore described. As the articles recirculate in each of the beds they are gently turned over. During this circulatory travel of articles and particles in each of the beds some of the articles and particles spill out of the beds and are caught by the next successive bed in the succession of beds and the action repeats. In this fashion the articles and particles move through the system from the upstream end of the bin to the downstream end thereof. To give some idea of dimensions of a bin actually constructed and tested, and the rate at which articles were finished, a bin was constructed having a length of approximately 8½ feet and a width of 1½ feet and a depth of 6 inches. Articles of a suitable size for surface finishing in such size bin travelled from one end to the other thereof in about 30 minutes, and were thoroughly and properly surface finished.

A feature of advantage of this invention is that while the machines are in operation, the operator can tell by visual inspection the extent of finishing which has occurred and when substantially all of the articles have been surface finished.

Another feature of advantage of the machines is that the vibratory conveyor action thereof can be controlled so that agitation and movement of the articles to be finished are gentle. Yet, because of the relative motion between the abrasive particles and articles to be finished, the abrading, scrubbing, or deburring action is most effective.

Still another feature of advantage of this invention is that regardless of the shapes of the articles to be finished, all surfaces of the articles are contacted by the abrasive particles in following the teachings of this invention.

The methods of this invention can be readily performed not only in the preferred embodiment of the finishing machines illustrated in the drawings, but in other machines of different construction.

The methods and machines of this invention are applicable not only with a bed of abrasive particles in the dry state, but also to a bed of abrasive particles suspended in a liquid to form a slurry. Generally speaking, any of the conventional deburring or surface finishing solids such as sand, silicon-carbides, and the like may be used in practicing the teachings of this invention.

What is claimed is:

1. An apparatus for deburring articles, which comprises: a bin for containing a bed of relatively abrasive particles and articles to be deburred, said bin having a front end, two sides, a normally horizontally disposed bottom in combination with vibratory conveyor means for applying vibratory conveying forces thereto, and a back end comprising an end closure member with a concave surface facing said front end for directing articles at said back end into a circulatory path in said bed, said end closure member being upwardly pivotable out of engagement with said bottom for permitting articles and particles to be vibratorily conveyed from said bin; and means for pivoting said end closure member into and out of engagement with said bottom.

2. An apparatus for surface finishing articles, which comprises: a bin for containing a bed of relatively abrasive particles and articles to be finished, said bin having a front end, two sides, a normally horizontally disposed bottom in combination with vibratory conveyor means for applying vibratory conveying forces thereto, and a back end comprising an end closure member with a concave surface facing said front end for directing articles at said back end into a circulatory path in said bed, said end closure member being upwardly pivotable out of engagement with said bottom for permitting articles and particles to be vibratorily conveyed from said bin; means for pivoting said end closure member into and out of engagement with said bottom, screen means backwardly of said end closure member for receiving particles and finished articles vibratorily conveyed from said bin and for separating articles from said particles; and means in combination with said screen means for returning particles to said bin.

3. An apparatus for deburring articles, which comprises: a vibratory conveyor bed having a generally horizontal, impervious top for vibratorily conveying articles thereon; a pair of side walls and a front wall mounted on said conveyor bed top; a back end closure member pivotally mounted between said side walls with the bottom end thereof normally in engagement with said conveyor bed top, said back end closure member having a concave surface on the inner side thereof with the axis of said surface being transversely and horizontally disposed;

and means for pivoting said back end closure member into and out of engagement with said conveyor bed top.

References Cited by the Examiner

UNITED STATES PATENTS

| | | | |
|---|---|---|---|
| 1,672,807 | 6/1928 | Etzel | 51—7 |
| 2,143,610 | 1/1939 | Muller et al. | 51—7 |
| 2,222,777 | 11/1940 | Linke | 51—163 |
| 2,389,337 | 11/1945 | Zademach | 51—163 |
| 2,554,022 | 5/1951 | Gould | 51—163 |
| 2,554,701 | 5/1951 | Hackett et al. | 51—163 |
| 2,660,835 | 12/1953 | Burden | 51—163 |
| 2,840,923 | 7/1958 | Behrens | 51—7 |
| 2,993,585 | 7/1961 | Musschoot | 51—7 |
| 2,997,814 | 8/1961 | Brandt | 51—7 |
| 3,108,408 | 10/1963 | Dahlquist et al. | 51—163 |

LESTER M. SWINGLE, *Primary Examiner.*

JOHN C. CHRISTIE, *Examiner.*